Patented June 9, 1942

2,285,902

UNITED STATES PATENT OFFICE 2,285,902

TREATMENT OF BLACK LIQUOR SOAP AND THE LIKE

Ludwig J. Christmann, Bronxville, N. Y., and Alfred G. Houpt, Stamford, Conn., assignors to American Cyanamid Company, New York, N. Y., a corporation of Maine No Drawing. Application June 8, 1938, Serial No. 212,516

13 Claims. (Cl. 260—97.5)

This invention relates to a method for the separation of black liquor soap or the like into the constituent fatty acids, fatty acid soaps, rosin acids, unsaponifiable fats and the like.

Heretofore the attempts to separate the components of black liquor soap or talloel have included such methods as high vacuum fractional distillation, crystallization, preferential esterification and combinations of these methods. However, these attempts have been generally unsuccessful. Among the reasons to which this lack of success may be attributed were the poor yields, general lack of sharp separation of acids, corrosion of equipment, manipulation difficulties arising from the nature of the materials treated and the high cost of the methods used.

We have now found that we can separate the fatty acids from the rosin acids of black liquor soap by a process which includes forming a hot aqueous solution of the rosin acids with salts of fatty acids, in an organic solvent in which the salts are soluble hot but insoluble at room temperatures, and in which the rosin acids are soluble both hot and at room temperatures, driving off the removable water from the solution until it contains less than 1.5% water by volume, cooling the solution to precipitate the salts of the fatty acids, filtering off the precipitated salts and recovering the rosin acids from the solution and the fatty acids from the salts if desired.

The following is a detailed description of one method of carrying out our process, it being understood that our invention is not restricted to the specific details and procedure set forth.

I. BLACK LIQUOR SOAP PURIFICATION

The crude black liquor soap is preferably first treated for the removal of various impurities such as lignins and sulphur compounds. These impurities are removed by dissolving and reprecipitating the soaps from an alkaline salt solution in which the lignin and sulphur compounds remain dissolved. The crude black liquor soap, containing 25–40% of water, is dissolved in an equal weight of water in an iron tank by heating to 70°–80° C. for 15–30 minutes with agitation sufficiently slow so that a voluminous froth is not raised. To this hot soap solution there is added an amount of caustic soda equal to 1% of the weight of the water added and an amount of sodium sulphate equal to 5 or 6% of the weight of the water added. The caustic and sodium sulphate can be added as powdered solids or as concentrated solutions, but the water added in such solutions should be included in calculating the weights of caustic and of sodium sulphate needed.

The solution is kept hot and agitation continued until the caustic and sodium sulphate are all dissolved and dispersed which should require about 15–30 minutes at 75° C. The solution will thicken and soap will begin to precipitate as soon as the caustic and sodium sulphate are added. The solution is then cooled with very slow agitation to below 30° C. and is left standing without mixing for 30 minutes so that the soap can rise and form a cake. The liquor is tapped off at the bottom and it should be possible to drain off a weight of blackish liquor equal to the combined weights of added water, caustic, and sodium sulphate. The soap layer remaining in the tank will be orange in color and mild in odor contrasted to the black color and sour odor of the crude black liquor soap. This single reprecipitation reduces the impurities in the soap, such as lignin and mercaptans, by about two-thirds and only 1 to 2% of the total fat content is lost.

In practice this solution and reprecipitation is preferably repeated once more just as described above. The resulting twice-reprecipitated black liquor soap is buff colored and has a mild odor. It contains only about one-tenth as much lignin as the original crude black liquor soaps and the other soluble impurities have been reduced to a corresponding extent with a total loss of less than 3% of the total fat content. The separated liquors can be used in the kraft wood pulp process by evaporating and burning them for alkali recovery. Sodium chloride, sodium carbonate, or sodium hydroxide can be substituted for the sodium sulphate, on the basis of soda ($Na_2O$) equivalent, as the reuse of the liquors may dictate.

II. CONVERSION OF PURIFIED BLACK LIQUOR SOAP TO TALLOEL

The purified black liquor soap is acidified with excess sulphuric acid and the total fatty material separated as talloel.

The twice reprecipitated black liquor soap is charged into a lead lined tank with a 3–5% excess of 30% sulphuric acid. The amount of sulphuric acid needed is based on a total alkali determination on a sample of the soap. The batch is agitated slowly and live steam blown through it until it has become thin and the temperature has risen to 85–90° C. Agitation is then stopped and after the aqueous layer is allowed to settle, it is tapped off at the bottom. The rate of settling will depend on several factors such as the temperature, the viscosity of the talloel layer (high rosin contents increase the viscosity), the amount of insoluble cellulosic fibers, and the extent of the previous lignin removal. If the soap contains more than 1% lignin, over 24 hours may be required for this separation, but with the twice reprecipitated soap sufficient separation will occur in 3-6 hours so that the water content of the talloel layer will be below 8%.

The lead lined tank used in this separation is preferably lagged so as to maintain a temperature of at least 80° C. during the separation and steam coils may be necessary if the separation is inordinately slow. The talloel is washed twice, to reduce the free sulphuric acid content below 0.2% by adding to the talloel half its weight of water, agitating, blowing with live steam until the temperature reaches 90° C., settling, and drawing off the aqueous layer as above. The sodium sulphate is recovered from the first aqueous layer and the two wash layers may be recycled as make-up for the 30% sulphuric acid and the first wash, respectively.

The washed talloel will contain from 2 to 8% of water and 0.05 to 0.20% of free sulphuric acid, depending on the time and temperature of settling, and a few tenths of a per cent of insoluble cellulosic fibers. It is recommended that this material be centrifuged while still hot whereby these impurities can be practically completely eliminated or, alternatively, the water can be eliminated by heating and the fibers removed by hot filtration.

The resulting refined talloel has a mild woody odor, is amber in color, and clear at temperatures above 60° C. Below that temperature it crystallizes to a thick mush of crystals of rosin acids and fatty acids.

III. SEPARATION OF THE FATTY ACIDS FROM TALLOEL AS FATTY ACID SOAP

The talloel is partially neutralized with sodium hydroxide whereby the fatty acids are combined as soaps. The fatty acid soaps are separated from the free rosin acids and the unsaponifiable fat by precipitation from amyl alcohol under substantially anhydrous conditions.

The refined talloel is added to three and one-half (3½) times its weight of secondary amyl alcohol in an iron still heated by steam coils, and an amount of powdered caustic soda is added equal to one and one-fourth (1¼) times the amount necessary to combine with the fatty acids present in the talloel. The caustic soda is preferably added concurrently with the talloel to prevent corrosion of the iron still by the talloel and also to prevent contamination of the batch by dissolved iron. These materials should be mixed with thorough agitation to prevent the separation of a layer of caustic in the bottom of the still. Heating the amyl alcohol during the addition facilitates the solution of the caustic.

The well-mixed batch is then boiled and the water removed by passing the vapors through a rectifying column and over a water trap surmounted by a reflux condenser. The water and amyl alcohol azeotrope coming over through the rectifying column is approximately half water and as secondary amyl alcohol dissolves water to the extent of only about 10%, the difference, or 40% of the distillate, settles out as a lower water layer in the water trap. The upper amyl alcohol layer of the condensate is allowed to flow continuously back into the still. The water separated in this operation is referred to as the removable water and includes the water formed by the neutralization of the caustic by the fatty acids plus any water in the caustic or in the talloel. Also, as part of the amyl alcohol is subsequently recovered by steam distillation and, consequently, contains 10% of water, this water from the wet amyl alcohol must be removed in this refluxing operation. It is preferred that the amount of removable water in the batch be reduced below 0.2% in order to obtain a maximum recovery of fatty acid soaps.

Table I shows the effect of residual removable water on the subsequent precipitation of the fatty acid soaps.

Table I

EFFECT OF WATER ON FATTY ACID SOAP PRECIPITATION FROM SECONDARY AMYL ALCOHOL

| Residual removable $H_2O$ | Fatty acid soap precipitated | Filterability of soap cake at about 25° C. |
|---|---|---|
| Per cent | Per cent | |
| 1.7 | 0 | |
| 0.5 | 35-50 | Difficult. |
| 0.2 | 85-90 | Fairly rapid. |
| 0.1 | 85-90 | Rapid. |
| 0.0 | 85-90 | Rapid. |

However, this removal of water by refluxing the secondary amyl alcohol solution is very rapid and the end is quite sharp, so that it is not necessary in practice to run water determinations on the batch. When water ceases to separate in the trap the batch is sufficiently dry and is ready to be cooled for the precipitation of the fatty acid soaps. The water layer separating in the trap contains approximately 0.2% of secondary amyl alcohol and may be used in the steam boilers, along with subsequently separated water layers saturated with amyl alcohol, for the generation of steam for operations involving the steam distillation of amyl alcohol.

The substantially dry, hot amyl alcohol solution is clear and must be cooled to precipitate the fatty acid soaps. The proportion of amyl alcohol used, 3.5 to 1 on the basis of the talloel is just about sufficient to dissolve the fatty acid soaps at the boiling point of the alcohol. Less alcohol has the tendency to cause the batch to foam during refluxing and may cause soap to separate in a gelatinous, unfilterable form. The batch should be cooled slowly with a very low speed agitator such as one of the anchor or gate type which will scrape the precipitated soap from the cooling surfaces of the container, but which will not grind the precipitate. The temperature is preferably allowed to fall uniformly from 120° C. to about 20° C. over 3 to 5 hours' time. This procedure will result in a coarsely granular precipitate which will filter rapidly.

The cooled batch is then blown through a filter press by gas pressure. It should best not be pumped through because the pump agitation may disperse the soap granules and slow up the filtration. An inert gas, such as nitrogen, should preferably be used in this step as well as in all others throughout the process, since exposure of the constituents of black liquor soap to air or oxygen causes rapid oxidation resulting in darkening of the products. A weight of fresh, dry secondary amyl alcohol equal to the original amyl alcohol charge, is forced through the press after the slurry to wash the rosin containing liquors from the fatty acid soap cake. In a plate and frame press of the "through washing" design, this proportion of wash liquor is sufficient to reduce the rosin acid concentration to about 1 to 2% in the fatty acids prepared from the filter cake. As the cake in the press retains 50 to 60% of its weight of liquor containing, before washing, about 15% of rosin acids, thorough washing is desirable for a good separation of the fatty acid and rosin acid constituents.

The first third of the wash liquor may be combined with the filtrate and treated as subsequently described for the recovery of the secondary amyl alcohol, rosin acids, and neutral fat. The latter two-thirds of the wash liquor may be used as make-up secondary amyl alcohol with the next batch of talloel and caustic soda along with that portion of wet secondary amyl alcohol later recovered from the filtrate or from the filter cake fatty acids by steam distillation.

IV. CONVERSION OF THE FATTY SOAP FILTER CAKE TO POWDERED SOAP

The fatty acid soap filter cake containing 50 to 60% of secondary amyl alcohol can be treated in either of two ways depending on whether the soap or the free fatty acid is desired.

For the production of soap the filter cake is charged directly into a vacuum, steam jacketed, dough mixer with a tail condenser for recovery of the amyl alcohol. The temperature should not exceed 80° C. so as to avoid fusion of the charge and a vacuum of 22–25 inches of mercury causes rapid distillation of the secondary amyl alcohol. Four to six hours are required for complete removal of the alcohol. The product is a pale buff colored, dry, free flowing pulverulent, powdered soap. The secondary amyl alcohol recovered by this vacuum distillation is dry and can be used as part of the wash for the next filter cake. If desired, various extenders, such as soda ash, can be incorporated during this amyl alcohol removal and water can be worked into the product to give a soap powder of the desired properties. For example, a product containing equal parts of soda ash, water, and the pure soap was made directly in the mixer from the fatty acid soap filter cake, and this product was a pale buff, free flowing, stable, soap powder having good solubility and lathering properties.

V. CONVERSION OF THE FATTY SOAP FILTER CAKE TO FREE FATTY ACIDS

For the preparation of free fatty acids from the fatty acid soap filter cake, the cake containing 50–60% of secondary amyl alcohol is charged in a lead lined still equipped with an agitator and set up for direct steam distillation. A slight excess of 30% $H_2SO_4$, over that indicated by a total alkali determination on a sample of the cake, is added. This batch should be well mixed before distillation is started in order to avoid foaming. Steam is then passed in and the total distillate collected until it no longer has an odor of amyl alcohol. The distillate will consist of two layers of approximately equal volume. The upper layer of amyl alcohol containing about 9% of water is used as part of the charge with the next batch of talloel and caustic. The lower aqueous layer of the distillate contains about 0.2% of amyl alcohol and can be used, along with the water layer trapped off from the reflux drying of the talloel, caustic, and amyl alcohol, for the generation of steam for the steam distillation of amyl alcohol from subsequent batches of fatty acids. The residue in the still is drawn off and the lower aqueous layer separated from the upper fatty acid layer. The fatty acid layer should be washed with a little water until the washings are no longer acidic to litmus. The layer separation and subsequent washing are facilitated if carried out while the batch is still hot from the steam distillation. The aqueous sodium sulphate layer from the still can be utilized for the kraft pulp process. The washed, warm, crude fatty acid layer may be centrifuged or filtered with a small portion of a filter aid such as kieselguhr for complete clarification. The product is a pale amber liquid having the characteristics listed in Table II.

Table II
CHARACTERISTICS OF THE CRUDE FATTY ACID

| | | |
|---|---|---|
| Free fatty acids | per cent | 97–98 |
| Free rosin acids | do | 1–2 |
| Neutral fat | do | 0.5–1 |
| Iodine number | | 125–135 |
| Acid number | | 195–200 |
| Color | | Amber |
| Odor | | Slightly woody |

At temperatures below about 25° C. this material begins to separate a precipitate of palmitic acid crystals and the iodine number of the fluid portion increases. By refrigerating and filtering the whole fatty acid material in steps down to about 0° C. it can be separated into (1) a saturated, solid fatty acid fraction consisting mainly of palmitic acid and (2) an unsaturated, liquid fatty acid fraction consisting mainly of linoleic acid.

By vacuum distillation or vacuum steam distillation the crude, amber fatty acid can be converted to nearly colorless refined fatty acid with a yield of about 95%. Such distillation serves to remove iron compounds and traces of water, resins, and oxidized fats. The fatty acid refined by distillation has the characteristics listed in Table III.

Table III
CHARACTERISTICS OF DISTILLED FATTY ACID

| | |
|---|---|
| Boiling range at 1 mm. Hg | 157°–169° C. |
| Iodine number | 126–129 |
| Acid number | 198–202 |
| Unsaponifiable | Less than 0.2% |
| Color | Very pale yellow |
| Odor | Slight |

This distilled fatty acid separates crystals of palmitic acid below about 25° C. and by a process of refrigeration and filtration as described for the crude fatty acids it may be separated into a solid and a liquid fraction.

VI. RECOVERY OF SECONDARY AMYL ALCOHOL, CRUDE ROSIN ACIDS, AND NEUTRAL FATS

The secondary amyl alcohol filtrate from the fatty acid soap filter cake is charged into a lead lined still and treated with an excess of concentrated sulphuric acid, beyond that necessary to neutralize its total alkalinity so that the whole batch contains 0.25% free $H_2SO_4$. To prevent charring, this concentrated $H_2SO_4$ should be added as a cooled solution in 4 volumes of dry amyl alcohol. Two-thirds to three-fourths of the secondary amyl alcohol can then be directly distilled off as dry alcohol with 40–50 pounds steam pressure in the still coils. This dry amyl alcohol is used as wash liquor for the fatty acid soap filter cake. The excess sulphuric acid in the boiling dry amyl alcohol solution serves a dual purpose:

(1) It catalyzes the preferential esterification of any residual traces of fatty acids with the amyl alcohol so that these fatty acids can be recovered as esters along with the unsaponifiable fat and so do not contaminate the rosin acids;

(2) It catalyzes the transformation of "amorphous" resinic acids to crystallizable abietic acid.

The residue from this direct distillation is cooled and an equal volume of cold water or cold sodium sulphate solution is added with good agitation so as to extract and dilute the free sulphuric acid. The residual secondary amyl alcohol is then completely steam distilled out of the batch leaving abietic acid, unsaponifiable fat and fatty acid esters. This steam distillate is treated and utilized just as that from the preparation of the free fatty acids. The cooling and dilution with water are necessary to prevent hydrolysis by steam of the fatty acid esters formed under anhydrous conditions.

The rosin acid residue left from the amyl alcohol removal is denser than water and will make up the bottom layer in the still. Petroleum naphtha, of boiling range 90°–130° C., and in an amount equal to the weight of secondary amyl alcohol in the original charge, is added to the warm residue with vigorous agitation. This dissolves and floats the rosin residue after which the aqueous layer is allowed to settle and is drawn off. The free rosin acids are then extracted from the naphtha solution in an iron tank with aqueous 4% NaOH. The amount of 4% NaOH must be rather closely controlled to avoid emulsification. At 25°–26° C. the limits are 1.6 to 1.7 times that corresponding to the acid value of the naphtha solution. After thorough agitation the layers are allowed to settle at 25°–26° C. and separated and further treated as described below.

The upper naphtha layer is washed once with one-fourth its volume of aqueous 1% NaOH. The wash liquor is added to the rosin-alkali solution. The washed naphtha solution is transferred to an iron still and the naphtha recovered by distillation. The residue of neutral fat is an amber oil with a slight sweet odor. The amount obtained is about 12–15% of the talloel taken, this amount and also the composition of the material depending on the completeness of the previous fatty acid soap precipitation. Table IV gives the range of characteristics of this material.

*Table IV*

CHARACTERISTICS OF NEUTRAL FAT

| | | |
|---|---|---|
| Amyl esters of fatty acids | per cent | 30–40 |
| Amyl esters of rosin acids | do | 5–10 |
| Hydrocarbons | do | 20–30 |
| Sterols | do | 30–40 |
| Acid value | | 2–5 |
| Saponification value | | 80–120 |
| Iodine value | | 130–160 |

This neutral fat serves as a relatively high concentration of phytosterols, and these can be concentrated still more by saponification of this neutral fat with caustic and extraction of the phytosterols along with the hydrocarbons. The separation of the phytosterols from the hydrocarbons can be accomplished by fractional crystallization or other known methods.

The aqueous alkali solution of rosin acids, (principally abietic acid) is washed by thorough agitation in an iron tank with an equal volume of fresh petroleum naphtha of boiling range 90°–130° C. to extract any residual neutral fat. The layers are allowed to settle completely and separated as before. The upper naphtha layer is used to dissolve the next batch of rosin-residue from the amyl alcohol recovery. The washed aqueous layer is acidified in a lead lined tank by adding an amount of aqueous 30% $H_2SO_4$ solution equivalent to the NaOH used in the extraction and wash solutions. The batch is thoroughly agitated and heated to about 70° C. to coagulate the precipitated rosin acids. Enough petroleum naphtha will have been retained by the batch so that the free rosin acids will float to the top as an approximately 40% solution in the naphtha. It is advisable to add a small additional amount of naphtha to increase the rate of coagulation and separation of the two layers. The lower aqueous sodium sulfate layer is drained off and can be worked for alkali recovery for the kraft process. The petroleum naphtha-rosin acid layer is diluted with more petroleum naphtha to an 8–10% concentration of rosin acids and centrifuged, settled, or filtered with a little filter aid such as kieselguhr to remove the sludge of water and dark colored oxidized and polymerized rosin acids which are largely thrown out of solution by the dilution with petroleum naphtha. Their removal greatly lightens the color of the material. If contact of the materials with the air has been minimized during the processing by the use of an inert atmosphere, the amount of this sludge obtained should be well under 1% of the talloel employed.

The clarified 8–10% naphtha solution of rosin acids obtained by the foregoing procedure has an orange color and on complete evaporation of the naphtha yields a hard, brittle glass of crude rosin acids having the characteristics listed in Table V.

*Table V*

CHARACTERISTICS OF CRUDE ROSIN ACIDS

| | |
|---|---|
| Abietic acid (Twitchell method) | 95–98% |
| Neutral fat | 1–3% |
| Softening point of glass | 70°–80° C. |
| Crystallization | Rapid at 85° C. |
| Remelting point of crystals | 115–130° C. |
| Acid value | 170–180 |
| Color of glass | G (rosin scale) |
| Odor | Woody |

VII. PREPARATION OF DECOLORIZED ROSIN ACIDS

By further decolorization of the 8–10% naphtha solution of rosin acids with extractants such as furfural or resorcinol, or with activated adsorbent such as chars or clays, there is produced on evaporation of the naphtha a glass of rosin acids having a color of "N" or better according to the rosin scale.

For example, if the naphtha solution is thoroughly agitated at 85–90° C. for 20 minutes with 3% of resorcinol and 0.3% of water, and then settled, drawn off from the dark sludge, washed with water to remove the small amount of dissolved resorcinol, and then evaporated, there is obtained a glass of rosin acids having a color corresponding to "N" on the rosin scale. By a second extraction of the naphtha solution, with fresh resorcinol, before evaporation the color is improved only very slightly further. Approximately 8–10% of furfural is required to produce the same degree of decolorization as the 3% of resorcinol and 0.3% of water under the same conditions. The substitution of 4% of "Darco" or 10% of acid activated Bentonite for the resorcinol and water gave rosin acid glasses of the same color (N) after removal of the adsorbent by filtration and evaporation of the naphtha.

These methods of decolorization gave recoveries of 80–85% of the rosin acids. The odor was improved as well as the color, the decolorized products having a much milder woody odor than the crude rosin acids. The other characteristics listed in Table V for the crude acids were not appreciably altered by the decolorization treatments.

The use of the activated clay was considered to be the most practical, even though larger proportions were required, because of its easy recovery and reactivation by roasting.

VIII. Preparation of Crystalline Abietic Acid

The rosin acid glasses prepared by the foregoing procedures differ from wood or gum rosins in having much higher abietic acid contents and very much lower non-acidic or unsaponifiable contents. Probably because of this difference they crystallize much more readily and completely than wood or gum rosins. These properties of the rosin acids separated from black liquor soap or talloel by the foregoing procedures render them a very favorable source of highly purified, crystalline abietic acid.

Two general procedures for crystallizing out the abietic acid are as follows:

(1) The petroleum naphtha is distilled from the 8–10% clear solution until the temperature of the residue reaches about 135° C. or until the residue constitutes a 50–60% solution of the rosin acids. This hot solution is then transferred to an aluminum dough mixer under an inert atmosphere and cooled to 50–60° C. At this temperature it is seeded with a few crystals of abietic acid and with slow mixing brought down to a temperature of 20°–25° C. uniformly over a period of 3 to 6 hours. The mixing is continued for a further 2 hours and the thick slurry is then filtered. The bulky cake of abietic acid is washed in the filter with a very small portion of low boiling (60°–90° C.) petroleum naphtha and then dried in a vacuum mixer or in an inert atmosphere. The yield is about 40% of the crude rosin acids for this single crystallization. The product is a practically white, free flowing, dry powder consisting of brilliant, uniformly shaped and sized crystals about 0.5 millimeter in diameter. By further evaporating the mother liquor and again cooling and seeding a second batch of crystals is obtained and the filtrate from this crystallization will yield a third batch, so that in all about 80% of the crude rosin acids can be recovered as crystallized abietic acid. In practice the second and third crystallizations are not employed, but the mother liquor is recycled with the next batch to be crystallized.

(2) The crude rosin acid glass resulting from the complete evaporation of the petroleum naphtha from the 8–10% solution is dissolved in an equal weight of a 92% anhydrous methanol 8% water mixture by refluxing with good agitation. The solution is cooled slowly with continued agitation and some abietic acid seed crystals are added when the batch temperature is between 50° and 55° C. The cooling is continued uniformly down to 15°–20° C. over a time of about 6 hours. The resulting thick slurry is filtered and the cake washed well with 92% methanol. The product is dried in a vacuum mixer in an inert atmosphere. The yield of pale buff, dry, free flowing abietic acid crystals is about 65% of the crude rosin acids.

The characteristics of the abietic acid crystallized from the crude rosin acids by both of the foregoing methods are given in Table VI.

Table VI
CHARACTERISTICS OF CRYSTALLINE ABIETIC ACID

| | From naphtha | From 92% methanol |
|---|---|---|
| Melting point range | 150°–158° C | 135°–142° C. |
| Color of fused material (rosin scale) | X | N to W. |
| Color of dry crystals | White | Very pale buff. |
| Acid value | 182–185 | 180–185. |
| Iodine value (Hanus) | 155–165 | 155–165. |
| Odor | Faintly woody | Faintly woody. |

IX. Separation of Fatty Acid Soap Directly From the Purified Black Liquor Soap In Sections II and III is described the procedure for converting the purified black liquor soap to talloel and partially neutralizing the talloel with caustic soda for the precipitation of the fatty acid soap. As an alternative, the purified black liquor soap may be partially acidified with sulfuric acid and the fatty acid soaps precipitated directly in the presence of dry amyl alcohol. This second method, while it eliminates the operations involved in preparing the talloel and saves half of the sulfuric acid and an equivalent amount of caustic soda, has two relative disadvantages:

(1) It requires considerably more heat, as the black liquor soap contains 30 to 40% of water which must be removed from the partially acidified amyl alcohol solution by refluxing, while the talloel contains practically no water after hot settling or centrifuging.

(2) The hot, anhydrous amyl alcohol solution must be separated from a sludge of sodium sulfate and cellulose fibers, either by decantation or by filtration, before the precipitation of the fatty acid soap by cooling.

However, these disadvantages may under some circumstances be outweighed by the aforementioned savings in operations and materials. Therefore, this alternative procedure is described as follows:

The purified black liquor soap may be dissolved in two and one-third (2.33) times its weight of secondary amyl alcohol in an iron still by agitation and heating. A weight of aqueous 30% sulfuric acid is added, sufficient to reduce the total alkalinity of the batch to one and one-fourth (1.25) times that necessary to combine with the fatty acids present. The batch is then refluxed and the water trapped out of the refluxing azeotrope just as described for the first method (Section III). While still at a temperature above 120° C., the dehydrated batch is allowed to settle and is drawn off from the sludge of solid sodium sulfate and insoluble cellulosic fibers. More complete clarification is obtained if the hot liquor is blown off through a preheated filter. It is essential that the liquor be kept sufficiently hot so that soap does not begin to separate as this would prevent any decantation or filtration at this point. The separation of the sodium sulfate sludge is desirable not only to preclude contamination of the fatty acid soap filter cake by it, but also because it may plug the pipe line and valves between the kettle and filter if left in the batch with the precipitated fatty acid soap.

The hot amyl alcohol liquor after the removal of the sludge is treated just as the dehydrated batch for the first method (Section III) for the precipitation and separation of the fatty acid soap.

From the above it will be seen that we have discovered a simple and economical process for the separation of the fatty acids from the rosin acids and neutral fats in black liquor soap or talloel by means of partial neutralization, dehydration and proper choice of solvent materials. The partial neutralization is a striking, simple method for producing a sharp difference in solubility between the fatty acid soaps and the rosin acids. The dehydration is especially advantageous for avoiding hydrolysis and emulsification. The choice of a solvent such as secondary amyl alcohol permits dehydration by simple azeotropic distillation, sharp separation of fatty acid soaps from free rosin acids and neutral fats by great differences in solubility and separation of the fatty acid soaps from true solutions as granular, easily filterable precipitates.

It will be obvious that the details of the process as described may be varied to a large extent and many of the incidental steps may be omitted or modified in accordance with desired practice.

Other materials than those named may be used in carrying out our procedure. In place of sodium hydroxide, calcium hydroxide, potassium hydroxide, ammonia or the like may be used either alone or in admixture although we generally prefer the use of sodium hydroxide. The same is true of equivalents for other sodium compounds described herein. In place of secondary amyl alcohol we may use other solvents such as isopropyl, secondary butyl, tertiary butyl, and tertiary amyl alcohols, hexyl alcohols, cyclohexanol, petroleum naphthas, benzene, toluene, chlorobenzol, dichloroethylene, and acetone as well as various mixtures of these solvents with each other or with suitable proportions of other materials such as with very small amounts of methyl and ethyl alcohols or the like. Likewise other suitable acids may be used in place of sulphuric.

We have found that the simplest manner of dehydrating our solutions is usually by azeotropic distillation, especially when the solvent used is suitable for this purpose. However, when the solvent does not form an azeotrope with water, another material may be added to assist in the azeotropic distillation of removable water to the desired degree. Another method which we may utilize is to dehydrate the mixtures of fatty acids or fatty acid salts and the rosin acids by any suitable method such as by evaporation or by azeotropic distillation with a material which plays no especial part in the remainder of the process. After the removable water is reduced to the desired extent, the solvent is added and the separation proceeds as previously set forth.

As described in Section IX, the black liquor soap may be treated with acid to liberate the free rosin acids. In place of the sulphuric acid mentioned therein, other acids may be used. One alternative which we may utilize is to add talloel or free fatty acid from some other source to the black liquor soap in an amount sufficient to combine with the alkali of the rosin acid salts and thus liberate the free rosin acids.

The amount of removable water is preferably reduced to the least convenient amount economically feasible, and we find that less than about 1.5% by volume of removable water should be present for best separation of the fatty acid soaps from the rosin acids. This optimum varies somewhat with the composition of the solvent, but, in any event, the amount of removable water should be below 1.5% by volume. By removable water, we mean that water which is present in the compositions and which can be removed to substantially the same degree as compared with that removed by azeotropic distillation with secondary amyl alcohol as a standard.

To assist in precipitation of the fatty acid soaps from the solutions, we may cool down to room temperatures or, with some solvents, we may resort to artificial cooling to even lower temperatures as by the use of coils containing cold brine or the like.

Thus it will be seen that the definition of the solvents in the terms of their solvent power when hot and when cold is in the nature of a relative action. For convenience of operation, cooling down to room temperature is ordinarily the most economical compromise for best commercial results since the additional cost of further cooling may not be justified by any increase in yield. Likewise the temperature at which the hot solvent is used may vary somewhat depending upon the degree of solubility of the mixtures in the hot solvents. Naturally it is not desired to heat to any temperature higher than necessary to obtain solution since additional heating is obviously uneconomical. Likewise it is obviously undesirable for the operation of the process as described to heat to such a point that the acids may be esterified.

In that part of our procedure wherein we describe the formation of a solution of fatty acid soaps and rosin acids, and then dehydrate such solution, it may be possible that we actually have, at first, a solution of fatty acids, rosin acids, and alkali in the aqueous-organic solvent mixture. This may be due to the fact that the presence of substantial amounts of removable water in the hot solution may cause hydrolysis of fatty acid soaps or may cause the equilibrium to go to the fatty acid side. In any event, we find that, regardless of theory, when we reduce the removable water to less than 1.5% by volume and then cool the solution, precipitation of filterable soap occurs.

Various methods may be utilized for improving yields and recoveries of materials as well as for purifying the products obtained. Throughout the process, it is desirable to minimize oxidation and contamination by the use of inert atmospheres and apparatus of suitable design and materials. Likewise the use of wash liquids and the like from one step in another step is not necessary but is economically desirable.

It will be apparent that the present invention is susceptible to many variations and changes other than those noted, the latitude of change and scope of invention being limited only as defined in the appended claims.

We claim:

1. The process of separating the fatty acids from the rosin acids of black liquor soap which comprises forming a hot, substantially anhydrous solution of fatty acids, rosin acids and alkali in an organic solvent in which the alkali salts of the fatty acids are soluble hot but not cold and in which the rosin acids are soluble hot and cold, cooling said solution to precipitate salts of the fatty acids, and separating the precipitated salts from the mother liquor, the alkali being present in substantially the amount necessary to neutralize only the fatty acids.

2. The process of claim 1 in which the solution contains less than 1.5% by volume removable water.

3. The process of separating the fatty acids from the rosin acids of black liquor soap which comprises dissolving in a hot organic solvent, a mixture containing rosin acids, fatty acids, alkali and removable water, the solvent being one in which the alkali metal salts of the fatty acids are soluble hot but not cold and in which the rosin acids are soluble hot and cold, dehydrating the solution until it contains less than 1.5% by volume removable water, cooling the solution to precipitate salts of the fatty acids, and separating the precipitated salts from the mother liquid, the alkali being present in substantially the amount necessary to neutralize only the fatty acids.

4. The process of separating the fatty acids from the rosin acids of black liquor soap which comprises dissolving an aqueous mixture of the rosin acids and salts of the fatty acids of black liquor soap in hot organic solvent in which the salts are soluble hot but not cold and in which the rosin acids are soluble hot and cold, dehydrating the solution until it contains less than 1.5% by volume of removable water, cooling the solution to precipitate the salts of the fatty acids, and separating the precipitated salts from the mother liquor containing the dissolved rosin acids.

5. The process of claim 4 in which the separated precipitated salts of the fatty acids are treated to convert the salts to fatty acids.

6. The process of separating the fatty acid salts from the rosin acid salts of black liquor soap which comprises adding to the aqueous black liquor soap sufficient acid to liberate only the rosin acids, dissolving the mixture of the fatty acid salts and rosin acids in a hot organic solvent in which the fatty acid salts are soluble hot but not cold and in which the rosin acids are soluble both hot and cold, dehydrating the solution until it contains less than 1.5% removable water by volume, cooling the solution to precipitate the fatty acid salts, and separating the precipitated salts from the mother liquor.

7. The process of separating the fatty acids from the rosin acids of black liquor soap, which comprises treating an aqueous mixture of the acids with sufficient alkaline material to saponify only the fatty acids, dissolving the treated mixture in a hot organic solvent in which the saponified fatty acids are soluble hot but not cold and in which the rosin acids are soluble hot and cold, dehydrating the solution until it contains less than 1.5% by volume of removable water, cooling the solution to precipitate the fatty acid soap and separating the precipitated soap from the mother liquor.

8. The process which comprises purifying black liquor soap by dissolving and reprecipitating the same, treating the purified soap with an acid to liberate the fatty acids and rosin acids, adding sufficient aqueous alkaline material to neutralize only the fatty acids, dissolving the resulting mixture in a hot organic solvent in which the rosin acids are soluble hot and cold and in which the salts of the fatty acids are soluble hot but not cold, dehydrating the solution until it contains less than 1.5% removable water by volume, cooling the solution to precipitate fatty acid salts and separating the precipitated salts from the mother liquor.

9. In a process of separating the rosin acids from the fatty acids of black liquor soap, the steps which comprise preparing an aqueous mixture of the acids in amyl alcohol with sufficient aqueous alkali solution to neutralize substantially only the fatty acids, heating the mixture to form a solution and to distill water and alcohol azeotrope until the solution contains less than 0.5% removable water by volume, cooling the solution to precipitate salts of the fatty acids, and separating the fatty acid salts from the solution of rosin acids.

10. The process of claim 9 in which the removable water is reduced to less than about 0.2% by volume.

11. The process of claim 1 in which the solvent is amyl alcohol.

12. The process of claim 3 in which the solvent is amyl alcohol and in which the solution is dehydrated until it contains less than 0.5% removable water by volume.

13. The process of separating the fatty acids from the rosin acids of black liquor soap which comprises preparing an aqueous mixture containing rosin acids, salts of fatty acids and an organic solvent in which the salts are soluble hot but not cold and in which the rosin acids are soluble hot and cold, heating the mixture to dissolve the acids and salts in the solvent, dehydrating the solution until it contains less than 1.5% by volume of removable water, cooling the solution to precipitate the salts of the fatty acids, and separating the precipitated salts from the mother liquor.

LUDWIG J. CHRISTMANN.
ALFRED G. HOUPT.